(12) United States Patent
Yanagisawa et al.

(10) Patent No.: US 7,835,250 B2
(45) Date of Patent: Nov. 16, 2010

(54) OPTICAL PICKUP DEVICE AND INFORMATION RECORDING/REPRODUCTION DEVICE

(75) Inventors: Takuma Yanagisawa, Tsurugashima (JP); Yasuo Tanahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 497 days.

(21) Appl. No.: 11/994,021

(22) PCT Filed: May 17, 2006

(86) PCT No.: PCT/JP2006/309861

§ 371 (c)(1),
(2), (4) Date: Dec. 27, 2007

(87) PCT Pub. No.: WO2007/004360

PCT Pub. Date: Jan. 11, 2007

(65) Prior Publication Data

US 2009/0092029 A1    Apr. 9, 2009

(30) Foreign Application Priority Data

Jul. 1, 2005    (JP) .............................. 2005-193655

(51) Int. Cl.
*G11B 7/00*    (2006.01)
(52) U.S. Cl. .............................. 369/112.03; 369/112.05

(58) Field of Classification Search ............ 369/112.02, 369/112.03, 112.05
See application file for complete search history.

(56) References Cited

U.S. PATENT DOCUMENTS

| 6,754,162 | B2 * | 6/2004 | Fujita et al. ............ 369/112.05 |
| 6,781,930 | B2 * | 8/2004 | Fukumoto ................ 369/44.32 |
| 2005/0002314 | A1 * | 1/2005 | Hasegawa et al. ....... 369/112.05 |
| 2005/0122862 | A1 * | 6/2005 | Shin et al. ................ 369/44.41 |

FOREIGN PATENT DOCUMENTS

| JP | 5-144075 | 6/1993 |
| JP | 2001-357550 | 12/2001 |
| JP | 2002-15442 | 1/2002 |
| JP | 2002-183992 | 6/2002 |

* cited by examiner

*Primary Examiner*—Wayne R Young
*Assistant Examiner*—Latanya Bibbins
(74) *Attorney, Agent, or Firm*—Drinker Biddle & Reath LLP

(57) ABSTRACT

The present invention makes it possible to accurately and adequately adjust the position where sub beams are shone when performing tracking correction or CTC using three beams.

The invention adjusts the positions where the sub beams are shone onto the surface of an optical disc DK by changing the angle of a diffraction grating 211 that is mounted inside an optical pickup. When performing adjustment, the angle of the diffraction grating 211 is performed in three stages: (i) rough adjustment, (ii) initial fine adjustment and (iii) continuous fine adjustment.

7 Claims, 9 Drawing Sheets

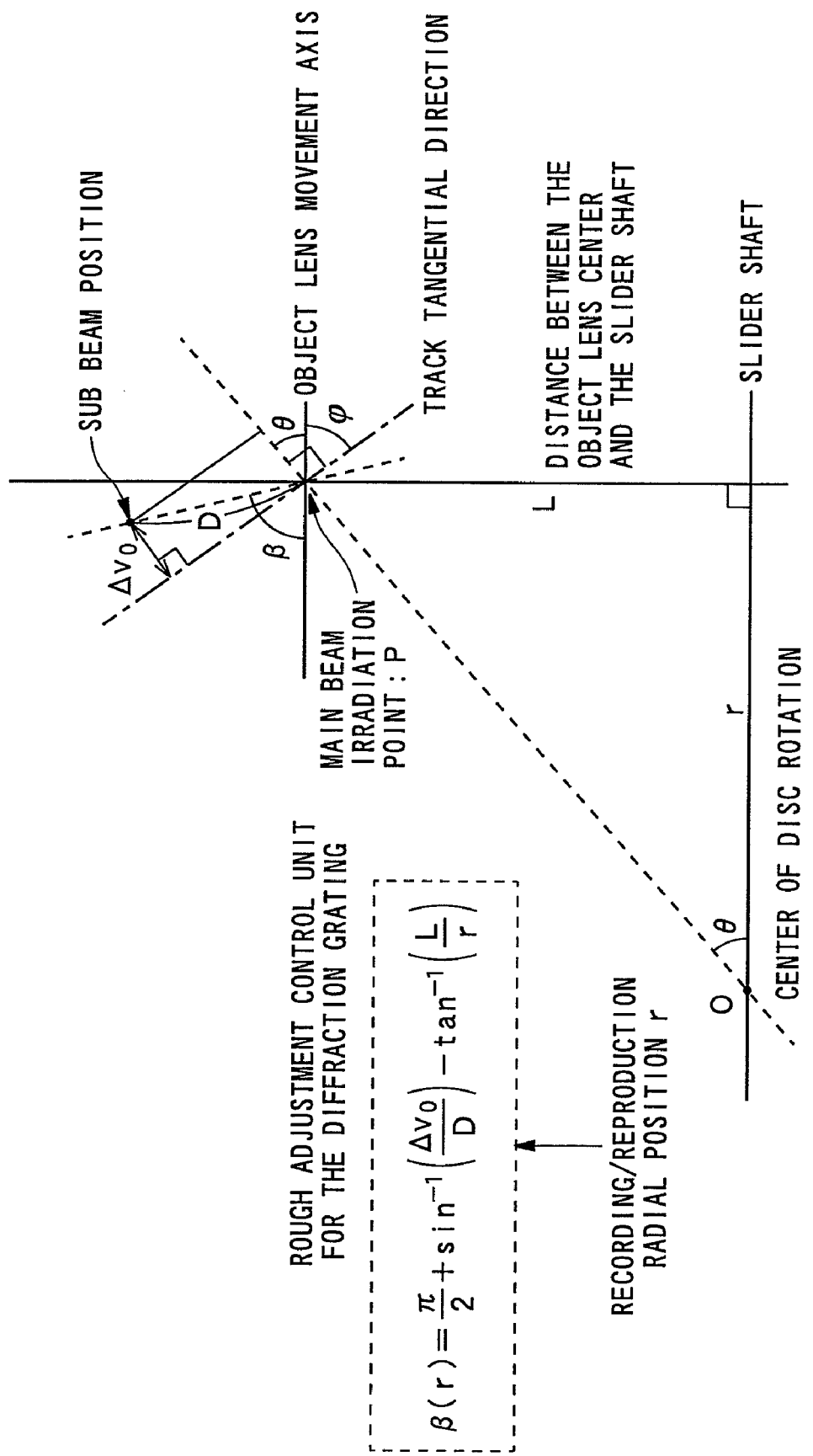

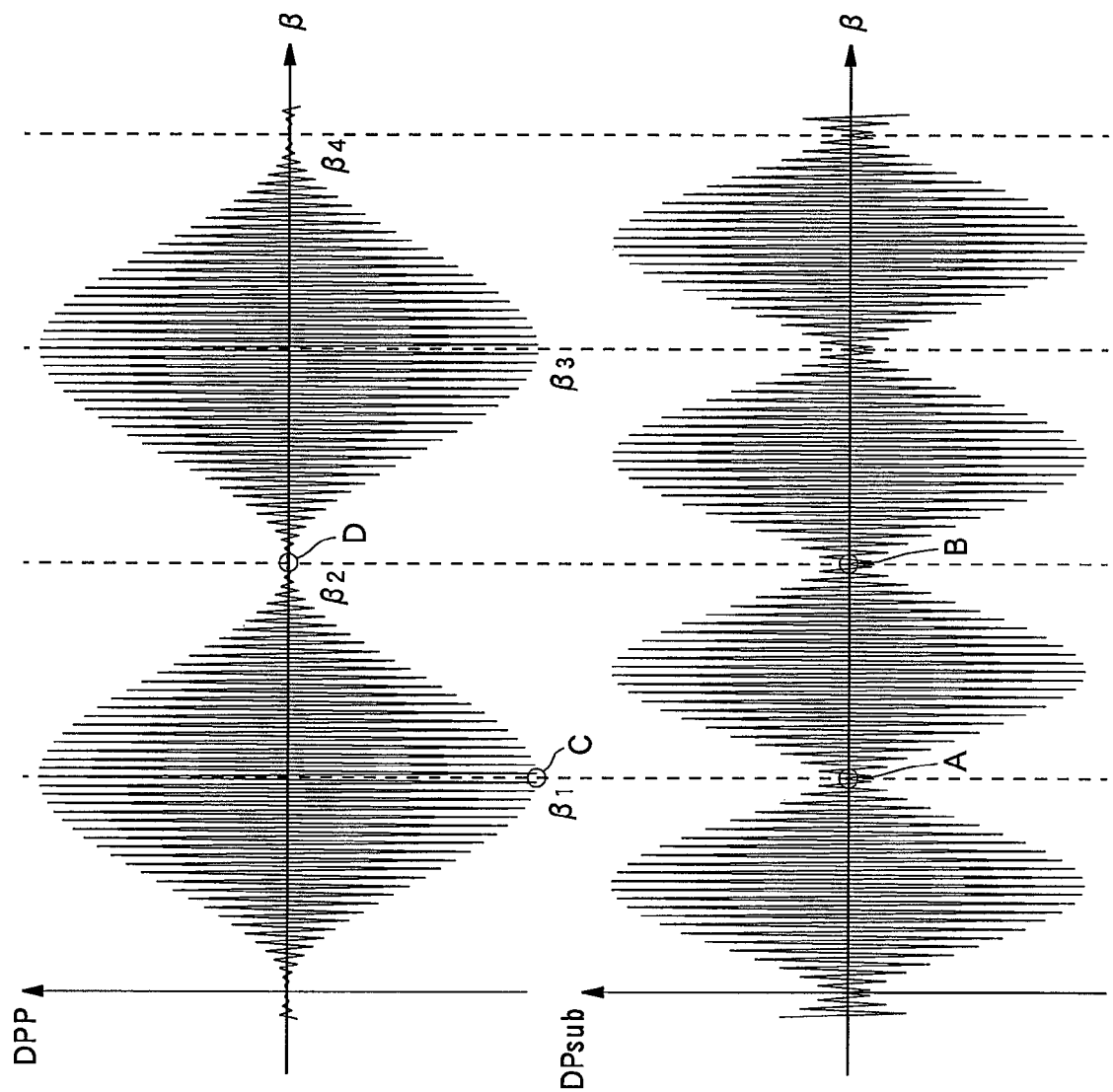

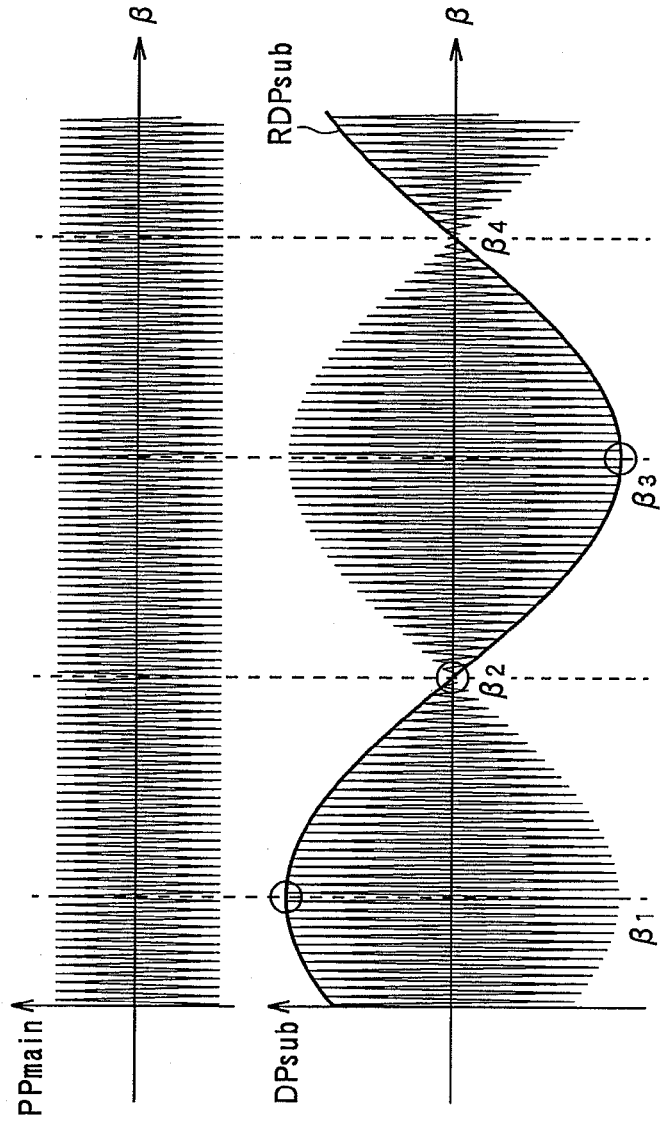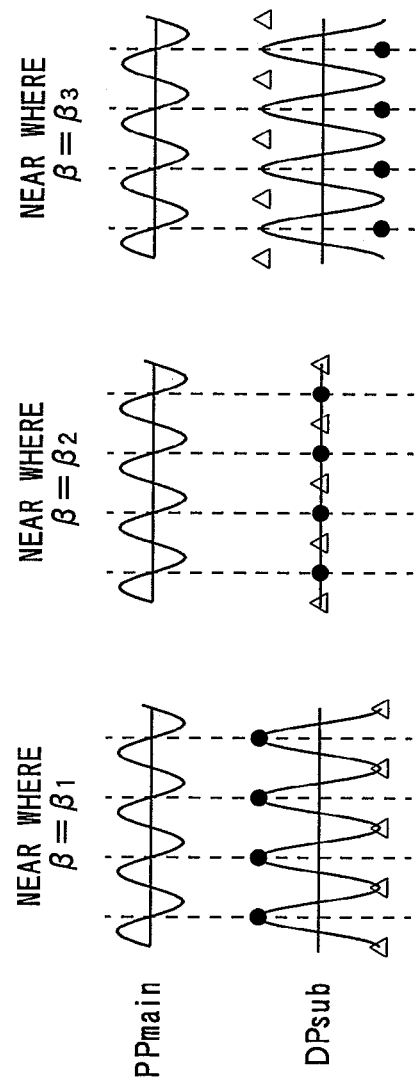
FIG. 8A
FIG. 8B

OPTICAL PICKUP DEVICE AND INFORMATION RECORDING/REPRODUCTION DEVICE

TECHNICAL FIELD

This invention relates to an optical pickup device and information recording/reproduction device that records information onto or reproduces information from an optical recording medium such as an optical disc.

BACKGROUND ART

Conventionally, in the field of information recording/reproduction devices that use an optical disc such as a CD (Compact Disc) or DVD (Digital Versatile Disc), various methods have been proposed for performing tracking correction and cross talk cancellation (hereafter, referred to as 'CTC'), and currently, a method of converting the light emitted from a light source into three beams, a main beam (0-dimension light) and two sub beams (±1-dimension light), and using the main beam and sub beams to perform tracking correction or CTC has become typical (for example, the differential push pull (DPP) method).

The tracking correction method or CTC method that uses these three beams has the characteristic that the positional relationship of where these three beams are shone onto the tracks that are formed on the disc surface is predetermined, and when this relationship of where the beams are shone is lost, it is no longer possible to perform tracking correction or CTC properly. For example, in the DPP method, it is necessary to maintain a relationship of opposite phase between the push-pull signal of the main beam and the push-pull signals of the sub beams, so it becomes essential that both sub beams be shone in the track normal direction onto positions that are spaced a half track pitch apart from each other (in other words, are shone onto the land tracks), and when this positional relationship is lost, it is no longer possible to obtain an accurate tracking error signal.

On the other hand, the track pitch of the optical disc differs depending on the current recording format, so in the case of a so-called compatible recorder (device that records data onto or reproduces data from optical discs having different recording formats), various designs have been proposed depending on the type of optical disc having differing recording formats in order to satisfy the positional relationship described above. For example, in Japanese patent application H5-144075, a method is proposed in which, in order to make tracking correction possible, the positions where the beams are shone are adjusted by rotating the diffraction grating according to the type of optical disc.

DISCLOSURE OF THE INVENTION

Problems to be Solved by the Invention

However, in the case of actually manufacturing this information recording/reproduction device, often the situation occurs due to limitations and restrictions during manufacturing of the device, in which the radial axis of the optical disc and the axis of movement of the center of the object lens (more specifically, the axis of movement along which the object lens is moved by a carriage servo or the like as the recording/reproduction position changes) become displaced. For example, when an optical pickup device having two object lenses is assembled inside an information recording/reproduction device, when one of the object lenses is placed on the slider shaft that runs parallel with the radial axis, the other object lens may be placed in a position that is shifted from the slider shaft in the tangential direction of the optical disc.

Due to the reason described above, when the radial axis of the optical disc and the axis of movement of the center of the object lens are displaced, then as shown in FIG. 1, as the recording/reproduction position of data changes, the angle of the track tangent line at the position where the object lenses are placed changes going from the inner portion of the optical disc to the outer portion. Therefore, as the search position on the optical disc changes, a phenomenon occurs in which the sub beams move in the track normal direction, and as a result the positions where the sub beams are shone onto the track change, and it is not possible to perform tracking correction or CTC.

Also, even though the object lens is placed on the slider shaft, due to manufacturing error of the optical disc, the center of the track and the center of the clamp hole may become offset, and as a result, displacement may occur between the center of the track arc and the center of rotation of the disc. When such a situation occurs, the positions where the sub beams are shone onto the disc change, and tracking correction or the like cannot be performed.

When the situation described above occurs, in order that tracking correction using three beams may be performed properly, it is desired that it be possible to change the positions where the sub beams are shone to correspond with the change in the track angle or track pitch that occurs when recording data onto the optical disc. However, in the case of the invention disclosed in Japanese patent application H5-144075, a method is employed in which the phase difference between the push-pull signals (in other words, the light receiving section of the OEIC is divided into two regions, and these are the signals for the difference between the output voltages from each region) that correspond to the ±1-dimension light of both sub beams (in order for better clarity of the invention, the +1-dimension light will be called 'sub beam a', and the −1-dimension light will be called 'sub beam b') is used to adjust the angle of the diffraction grating, so when the tracking servo loop become closed after the track search, the phase difference between the push-pull signals that correspond to both sub beams becomes unstable, and even though the positions where the beams are shone when recording or reproducing changes, it is not possible to follow this change.

Taking the conditions described above into consideration, it is the object of the present invention to provide an optical pickup device and information recording/reproduction device that are capable of accurately and properly adjusting the positions where the sub beams are shone when performing tracking correction or CTC that uses three beams.

Means for Solving the Problems

To solve the problems, according to one aspect of the invention, an optical pickup of claim 1 that focuses a light beam onto an optical recording medium having a spiral shaped recording track, and receives the light from that light beam that is reflected by the optical recording medium, is provided with: a diffraction device for diffracting a light beam that is emitted from a light source and emitting a main beam, and first and second sub beams; a focusing device for focusing the main beam and first and second sub beams onto the optical recording medium at positions that are shifted a specified amount in the circumferential direction from the radial axis that passes through the center point of the recording track; a light receiving device for receiving the light from the main beam and first and second sub beams that is reflected from the optical recording medium, and outputting an optical signal that corresponds to each beam; and an inter-beam distance adjustment device for controlling the diffraction device according to the tangent angle of the recording track near the positions where the main beam, and first and second sub beams are shone, and changing the distance in the radial direction between the main beam and first and second sub beams on the optical recording medium.

According to another aspect of claim 9, an optical pickup device that focuses a light beam on an optical recording medium having a spiral shaped recording track, is provided with: a diffraction device for diffracting a light beam that is emitted from a light source and emitting a main beam, and first and second sub beams; a focusing device for focusing the main beam and first and second sub beams onto the recording track; a light receiving device for receiving the light from the main beam and first and second sub beams that is reflected from the optical recording medium, and outputting optical signals that corresponds to each beam; a push-pull signal generation device for generating push-pull signals that correspond to the main beam and first and second sub beams based on the received optical signals that correspond to the main beam and first and second sub beams; and an inter-beam distance adjustment device for changing the distance in the radial direction between the main beam and first and second sub beams on the optical recording medium to a distance where the value of the difference between the push-pull signal that corresponds to the first sub beam and the push-pull signal that corresponds to the second sub beam becomes zero.

According to another aspect of claim 10, an information recording/reproduction device is provided with the optical pickup device of any one of the claims 1 to 9; a drive device for driving the optical pickup device; a control device for controlling the recording of information onto or reproduction of information from the optical recording medium by controlling the drive device; and a output device for outputting a signal that corresponds to the received light result by the optical pickup device.

According to another aspect of claim 11, a control method for controlling an optical pickup that focuses a light beam onto an optical recording medium having a spiral shaped recording track, and receives the light from that light beam that is reflected by the optical recording medium, and that is provided with: a diffraction process of diffracting a light beam that is emitted from a light source and emitting a main beam and first and second sub beams; a focusing process of focusing the main beam and first and second sub beams onto the optical recording medium at positions that are shifted a specified amount in the circumferential direction from the radial axis that passes through the center point of the recording track; and a light receiving process of receiving the light from the main beam and first and second sub beams that is reflected from the optical recording medium, and outputting an optical signal that corresponds to each beam; and is provided with an inter-beam distance adjustment process of controlling the diffraction device according to the tangent angle of the recording track at the positions where the main beam and first and second sub beams are shone, and changing the distance in the radial direction between the main beam and first and second sub beams on the optical recording medium.

BRIEF DESCRIPTION OF THE DRAWINGS

FIG. 4 is a drawing showing the theory of rough adjustment of the first embodiment.

FIG. 5A is a graph showing the waveform of the differential push-pull signal DPP that is obtained when the diffraction grating 211 is rotated when the tracking servo loop is in the open state; and FIG. 5B is a graph showing the waveform of the difference signal DPsub under the same conditions.

FIG. 8A is a graph showing the waveform of the differential push-pull signal PPmain that is obtained by a information recording/reproduction device of a second embodiment of the invention when the diffraction grating 211 is rotated when the tracking servo loop is in the open state; and FIG. 8B is a graph showing the waveform of the difference signal DPsub under the same conditions.

DESCRIPTION OF REFERENCE NUMERALS

RP . . . information recording/reproduction device
S . . . servo unit
EG . . . error signal generation unit
GC . . . diffraction grating angle control unit
AD . . . actuator drive unit
SP . . . signal processing unit
C . . . control unit
D . . . drive circuit
PU . . . optical pickup device
AS . . . actuator servo unit
P . . . reproduction unit

BEST MODE FOR CARRYING OUT THE INVENTION

[1] First Embodiment

[1.1] Construction of the First Embodiment (1) Construction of the Information Recording/Reproduction Device RP Next, the construction of an information recording/reproduction device of a first embodiment of the invention is explained with reference to FIG. 2. In this information recording/reproduction device RP, the optical pickup device of the present invention is applied to a compatible recorder (so-called 1-beam 2-disc type compatible recorder) that records information onto or reproduces information from an optical disc DK that corresponds to both the DVD and BD recording formats.

Figure 1:
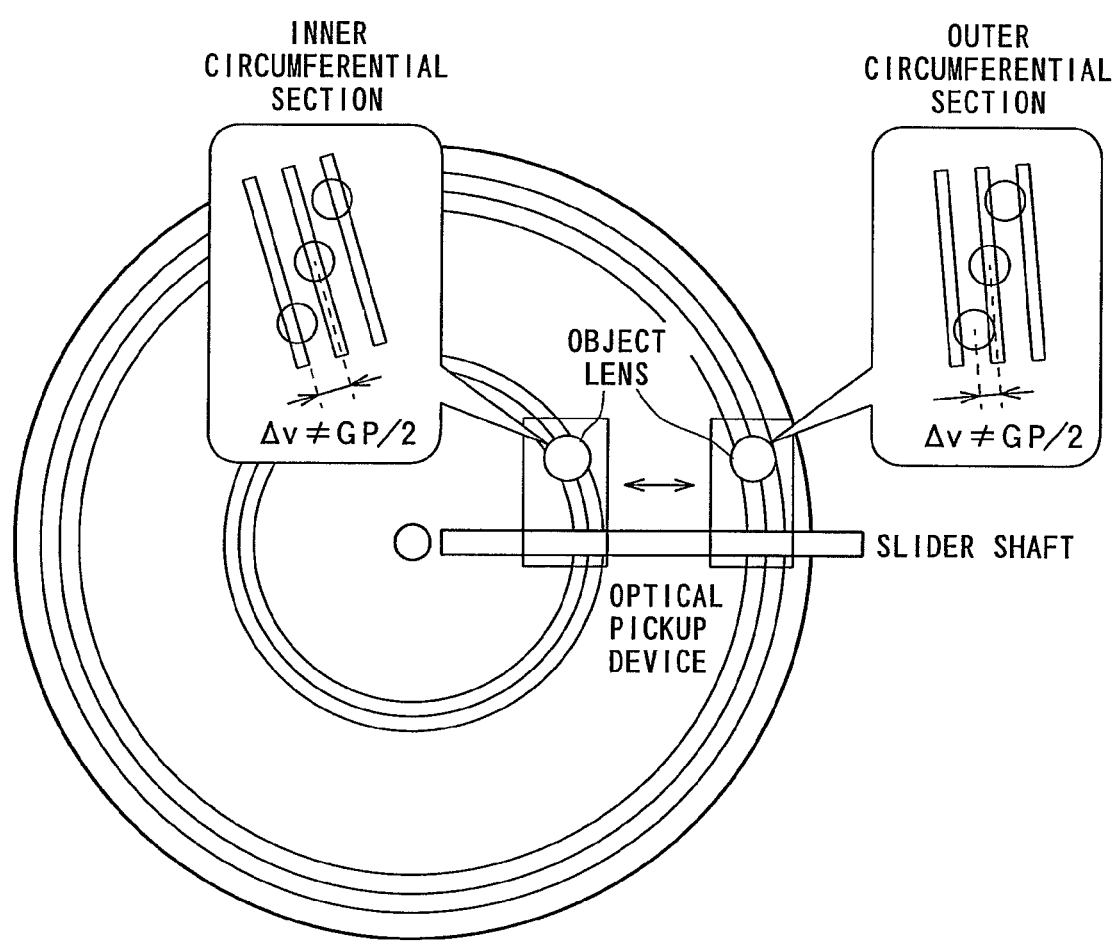
FIG. 1 is a drawing for explaining the problem that is solved by the present invention.
Figure 2:
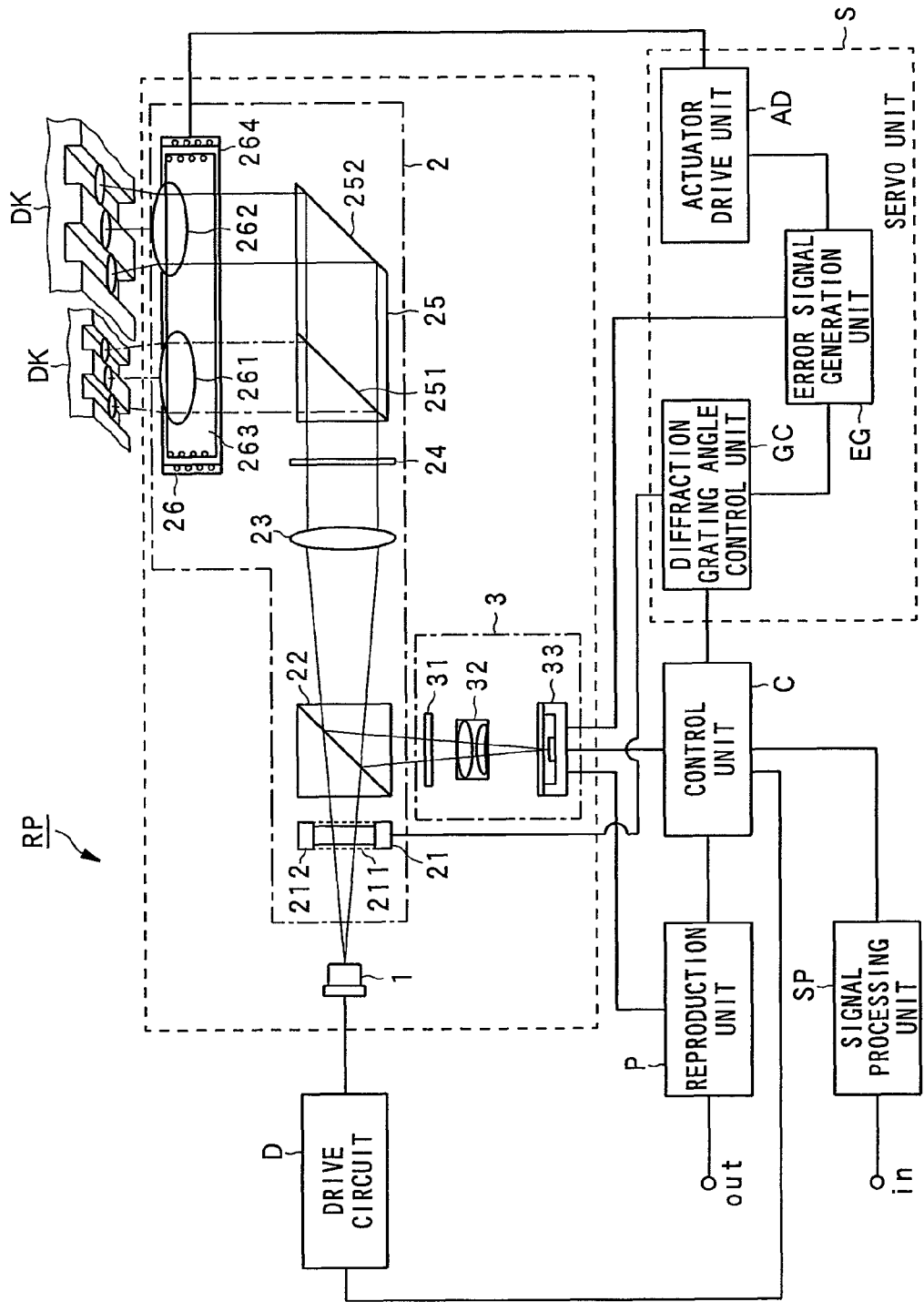
FIG. 2 is a block diagram showing the construction of an information recording/reproduction device RP of a first embodiment of the invention.

The information recording/reproduction device RP of this first embodiment of the invention shown in FIG. 2 comprises: a signal processing unit SP, control unit C, drive circuit D, optical pickup device PU, reproduction unit P and servo unit S. It is not shown in the drawing, however, the optical pickup device PU of this information recording/reproduction device RP is supported by a slider shaft that is fastened to a carriage, and by moving the carriage along the slider shaft (hereafter, referred to as the 'carriage servo'), the optical pickup PU can be moved in the radial axis direction of the optical disc DK (See FIG. 1).

Here, a feature of this first embodiment is that, from the aspect of compatibility, two object lenses (a first object lens 261 and second object lens 262) are mounted in the optical pickup device PU, and these object lenses 261, 262 are placed such that (a) the first object lens 261 is placed above the slider shaft, and (b) the second object lens 262 is placed at a position that is shifted in the tangential direction of the optical disc DK from the slider shaft (see FIG. 1). In the explanation below, in order to make the explanation more specific, the first object lens 261 will be for the BD recording format, and the second object lens will be for the DVD recording format.

On the other hand, with the placement of the object lenses 261, 262 of this embodiment, the recording/reproduction position of data changes, and as the optical pickup device PU moves along the slider shaft, the angle of the track tangent line changes at the placement position of the second object lens 262, and tracking correction or CTC that uses three beams (that is a main beam (0-dimension light) sub beam a (+1-dimension light) and sub beam b (−1-dimension light)) becomes difficult (see FIG. 1). Therefore, in the information recording/reproduction device RP of this embodiment, a method is employed in which the diffraction grating 211 that is located in the optical pickup device PU is rotated (angle adjustment) according to the search position on the optical disc DK, and the positions where the sub beams are shone are suitably controlled to correspond with the change in the angle of the track tangent line. More specifically, in the information recording/reproduction device RP of this embodiment, three main adjustments are performed as described below.

<Control During the Carriage Servo>

First, when the carriage servo is performed during a track search, in the information recording/reproduction device RP, angle adjustment of the diffraction grating 211 is performed in the following two stages before the tracking servo loop is closed.

(i) Rough Adjustment

When the carriage servo is performed, in the information recording/reproduction device RP, first, rough adjustment of the angle of the diffraction grating 211 is performed before the tracking servo loop is closed. The angle of the diffraction grating 211 that is set in this rough adjustment is quantitatively calculated according to how much the position of the second object lens 262 has shifted in the radial direction from the center position of the optical disc DK, and the angle of the diffraction grating 211 is changed based on the calculation results. By performing rough adjustment in this way before performing fine adjustment, the time required for the information recording/reproduction device RP of this embodiment to perform fine adjustment is shortened.

(ii) Initial Stage Fine Adjustment (Hereafter, Referred to as Initial Fine Adjustment)

As soon as the rough adjustment described above is completed, the information recording/reproduction device RP executes initial fine adjustment (second stage) without closing the tracking servo loop. This initial fine adjustment is executed based on an error signal that is generated by an error signal generation unit EG according to the received optical signal that is output from the OEIC 33 of the optical pickup device PU.

<Control After the Tracking Servo Loop is Closed>

After the control described above is performed and fine adjustment of the diffraction grating 211 is completed, the tracking servo loop is closed, and recording of data onto or reproduction of data from the optical disc DK is started, however, even under these conditions, it is necessary to continue to control the positions where the sub beams are shone since the angle of the track tangent line changes as the track from which data is read or to which data is written changes (hereafter, the adjustment in this third stage will be called 'continuous fine adjustment'). Therefore, in the information recording/reproduction device RP of this embodiment, after the tracking servo loop is closed, operation changes to the state of performing this continuous fine adjustment, and this continuous fine adjustment performs adjustment due to changes in the angle of the track tangent line.

By executing the series of rotating controls described above, the information recording/reproduction device RP of this embodiment is capable of performing accurate rotation control of the diffraction grating 211 during track searching, and even when the angle of the track tangent line changes as the recording/reproduction position of data changes, is capable of following those changes and rotating the diffraction grating 211 accordingly, and properly adjusts the positions where the main beam and sub beams a, b are shone.

With the method of adjusting the angle of the diffraction grating 211 as described above, it becomes possible to perform either (a) control of the positions where each of the beams are shone by the DPP method, or (b) control of the positions where each of the beams are shone when performing CTC, however, in this embodiment an example of employing the DPP method to this embodiment will be explained, and the construction for the case of performing CTC will be explained later in a variation of the embodiment. The DPP method is normally used when recording data onto an optical disc DK, and the tracking correction method that is used during reproduction is arbitrary; for example, it is possible to use the heterodyne method, which is representative of the DPP method.

The construction of the information recording/reproduction device RP of this embodiment, which performs the features of this invention, is explained below.

First, the signal processing unit SP comprises an input terminal, and performs a specified format of signal processing on the data that is input from the outside by way of this terminal, then outputs the result to the control unit C.

The control unit C mainly comprises a CPU (Central Processing Unit), and controls each of the units of the information recording/reproduction device RP. For example, when recording data onto an optical disc DK, the control unit C outputs a drive signal to the drive circuit D for performing recording that corresponds to the data input from the signal processing unit SP, and when reproducing data that is recorded on an optical disc DK, outputs a drive signal to the drive circuit D for performing reproduction. Also, the control unit C determines the type of optical disc DK, and when the optical disc DK that is the object of recording or reproduction of data is a DVD, controls a servo unit S and executes angle adjustment of the diffraction grating 211. The operation at this time will be described in detail later.

The drive circuit D mainly comprises an amplification circuit, and after amplifying the drive signal that is input from the control unit C, supplies the signal to the optical pickup device PU. The amplification rate of this drive circuit D is controlled by the control unit C, and when recording data onto an optical disc DK the amplification rate is controlled so that a light beam is output from the optical pickup unit PU at recording power (for a color change type or phase change type optical disc DK, the amount of energy required for generating a phase change or color change), and when reproducing data, the amplification rate is controlled so that an light beam is output at reproduction power (the amount of energy at which color change does not occur).

The optical pickup device PU shines a light beam onto an optical disc DK that corresponds to a plurality of different recording formats (BD, DVD, CD) based on a control signal that is supplied from the drive circuit D, and is used for recording data onto or reproducing data from the optical disc DK. In order to achieve this function of the present invention, the optical pickup device PU of this embodiment mainly comprises: a light source unit 1, optical unit 2 and light-receiving unit 3.

Of these elements, the light source unit 1 outputs a light beam based on a drive signal that is supplied from the drive circuit D. This light source unit 1 comprises a semiconductor laser that emits a 405 nm light beam for BD, and a semiconductor laser that emits a 660 nm light beam for DVD (so-called 2-laser 1 package), and the light beam that is emitted from the respective semiconductor laser is shone onto the optical unit 2 by way of the same optical path.

Next, the optical unit 2 comprises a diffraction unit 21, PBS (polarized beam splitter) 22, collimator lens 23, λ/4 plate 24, optical path dividing/combining unit 25, and actuator unit 26, of which the optical path dividing/combining unit 25 divides the optical path of the light beam that is shone on it from the light source unit 1 according to the wavelength of the light beam, and respectively directs light beams having a 405 nm wavelength to the first object lens 261, and directs light beams having a 660 nm wavelength to the second object lens 262.

Of these elements, the diffraction unit 21 comprises a diffraction grating 211, and this diffraction grating 211 diffracts the light beam that is shone on it from the light source unit 1 into three beams, 0-dimension light and ±1-dimension light, and emits that light as a main beam and sub beams a, b. Also, this diffraction unit 21 comprises a rotation mechanism 212 for rotating the diffraction grating 211 within a plane that is orthogonal to the optical axis of the incident light, and is capable of rotating the diffraction grating 211 based on a control signal that is supplied from a diffraction grating angle control unit GC (for example, see FIG. 3). By changing the angle of the diffraction grating 211 in this way, the rough adjustment described above is made possible.

The specific method used for rotating the diffraction grating 211 by this rotation mechanism 212 is arbitrary, for example, a method can be employed in which the diffraction grating 211 can be circular, and a protrusion section is formed around the outer circumference of the diffraction grating 211 such that the protrusion section comes in contact with a piezo element, and the diffraction grating 211 is rotated by supplying electric power to the piezo element from the diffraction grating angle control unit GC.

The PBS 22, for example, lets P polarized light beams pass, and reflects S polarized light beams, and in so doing directs the light emitted from the light source unit 1 to the collimator lens 23, and directs the light from the light beam that is reflected from the surface of the optical disc DK to the light receiving unit 3. The collimator lens 23 is an optical element that converts the incident light beams that were passed through the PBS 22 into parallel beams, and causes the reflected light from optical disc DK to converge, and the λ/4 plate 24 is an optical element that performs mutual conversion between linearly polarized light and circular polarized light. Through the function of this λ/4 plate 24, the polarized direction of the forward and reverse path is changed only by π/2, and the PBS 22 divides the splits the forward path and reverse path. Here, the 'forward path' is defined as the optical path of the light beam from the light source unit 1 toward the optical disc DK, and the 'reverse path' is defined as the optical path of the light beam that is reflected from the optical disc DK toward the light-receiving unit 3.

The optical path dividing/combining unit 25 is an element that divides the optical path into two optical paths according to the wavelength of the optical beam that is radiated on it from the λ/4 plate 24, and shines the beams on the actuator unit 26, or combines optical paths of reflected light that is shone on it by way of differing optical paths from the actuator, and shines the result on the λ/4 plate 24, and it comprises a dichroic mirror 251 and mirror 252.

In order to achieve the function of the present invention, the dichroic mirror 251 of this optical path dividing/combining unit 25 reflects light rays having a specified wavelength or less (for example, 450 nm), and lets light rays that are greater than that wavelength to pass through. As a result, a 405 nm light beam is reflected upward in the drawing by the dichroic mirror 251 and shone onto the first object lens 261, and the light that is shone onto the optical disc DK by way of the first object lens 261 and reflected from the optical disc DK is again reflected toward the left in the drawing by the dichroic mirror 251 and shone onto the λ/4 plate 24.

On the other hand, a 660 nm light beam for a DVD passes through the dichroic mirror, and is reflected upward in the drawing by the mirror 252 and shone onto the second object lens 262, then the light that is shone onto the optical disc DK by way of the second object lens 262 and reflected from the optical disc is reflected in the left direction in the drawing by the mirror 252, after which it passes through the dichroic mirror 251 and is shone onto the λ/4 plate 24.

Next, the actuator unit 26 comprises: a first object lens 261; a second object lens 262, an object lens holder 263 that secures both of the object lenses 261, 262, and a movement mechanism 264 that moves the object lens holder 263 as a unit, and this actuator unit 26 changes the position of the object lens based on a correction signal that is supplied from the actuator drive unit AD, and functions as a tracking servo and focus servo.

Next, the light receiving unit 3 is an element that receives the light that is reflected from the optical disc DK, and outputs a received light signal according to the received result, and it comprises a positioning grating 31, error detection lens 32 and OEIC 33.

This positioning grating 31, is a diffraction grating that is placed in the optical path of the reflected light that is emitted from the PBS 22, and is used for adjusting the position of the focused light spot on the OEIC. The error detection lens 32 is made from a cylindrical lens for example, and focuses the reflected light that is emitted from the positioning grating 31 onto the OEIC 33. The OEIC 33 comprises a photodiode for example, and it receives a light beam that is shone onto it from the error detection lens 32, and outputs a received optical signal to the control unit C, reproduction unit P and actuator drive unit AD.

The position of the focused spot of reflected light on the OEIC 33 changes as the diffraction grating 211 rotates, however, as disclosed in Japanese patent application H11-3532, for example, by designing the divided shape of the OEIC 33, or by rotating the OEIC 33 in synchronization with the rotation of the diffraction grating 211, it is possible to accurately receive light. Also, depending on the location where the OEIC 33 is set, it is possible to reduce the change in the position of the focused spot of light on the OEIC with respect to the change in the position where light is shone on the surface of the optical disc DK, and when this method is employed, it is possible to treat the received optical signal that accompanies that change as error.

Next, the reproduction unit P comprises an adder circuit and an amplification circuit, and generates a reproduction RF signal based on the received optical signal that is supplied from the OEIC 33. Also, after performing specified signal processing on the reproduction RF signal, the reproduction unit P outputs the result to the output terminal OUT.

The servo unit S is an element for controlling the rotation mechanism 212 and actuator unit 26 based on the received optical signal that is supplied from the OEIC 33 of the optical pickup device PU, and comprises an error signal generation unit EG, diffraction grating angle control unit GC, and actuator drive unit AD.

Of these elements, the error signal generation unit EG generates various error signals such as for the push-pull signal based on the received optical signal that is supplied from the OEIC 33, and outputs the signal to the actuator drive unit AD and error signal generation unit EG, and the actuator drive unit AD controls the actuator unit 26 based on the error signal that is supplied from the error signal generation unit EG.

The diffraction grating angle control unit GC is an element that controls the rotation of the diffraction grating 211 by way of the rotation mechanism 212, and makes the rough adjustment, initial fine adjustment and continuous fine adjustment possible. In the case of this embodiment, angle adjustment of the diffraction grating 211 is performed only when data is recorded onto or reproduced from a DVD using the second object lens 262, so the diffraction grating angle control unit GC switches between performing or not performing angle adjustment of the diffraction grating 211 according to the type of optical disc DK that is the object of data recording or reproduction.

(2) Detailed Construction of the Servo Unit S

Next, the construction of the error signal generation unit EG, diffraction grating angle control unit GC, actuator drive unit AD and OEIC 33 of the optical pickup device PU that form the servo unit S will be explained in detail with reference to FIG. 3.

Figure 3:
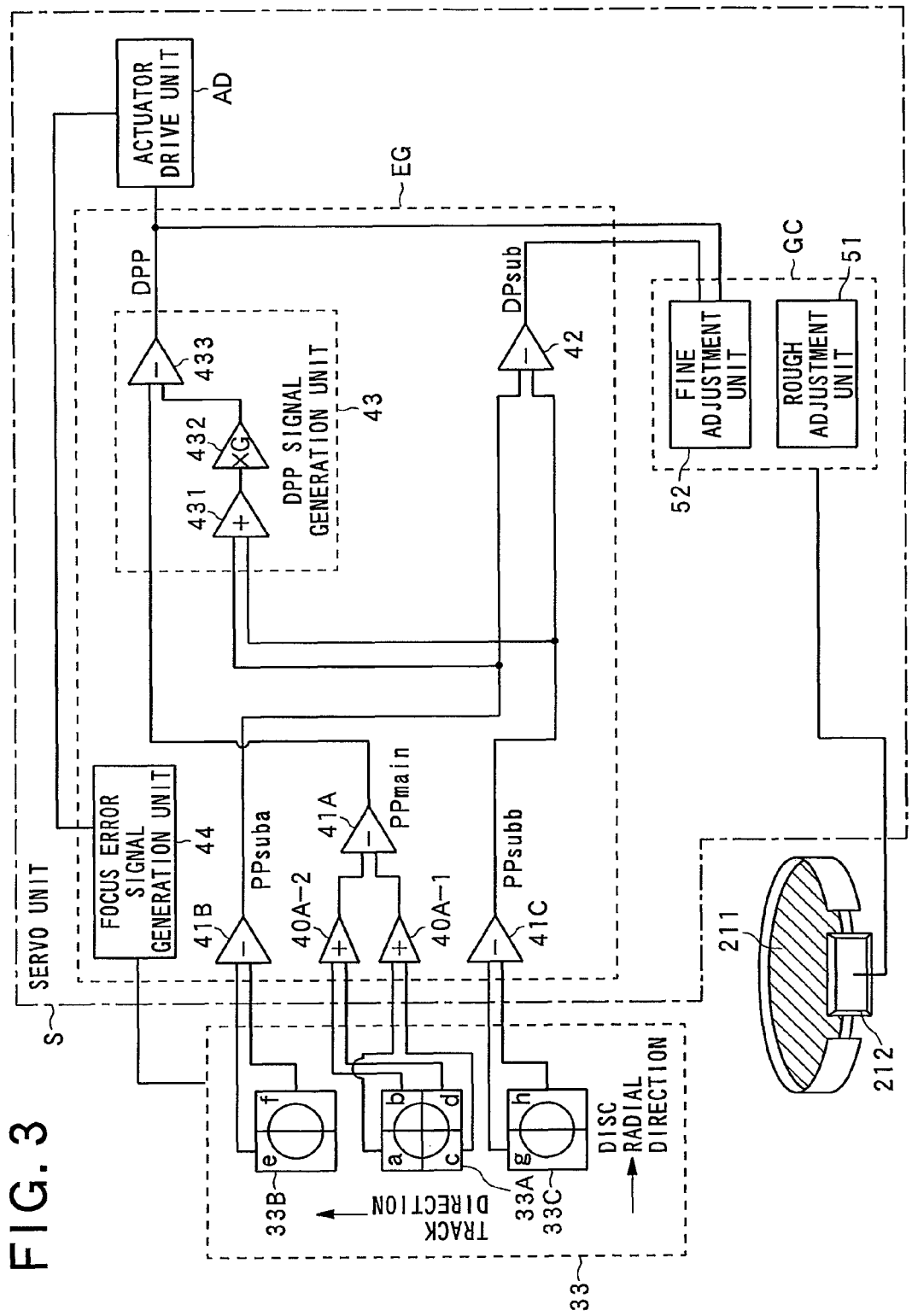
FIG. 3 is a block diagram showing the construction of a servo unit S of the first embodiment of the invention.

As shown in FIG. 3, the OEIC 33 of this embodiment comprises: (i) a first optical receiving unit 33A for receiving reflected light that corresponds to the main beam; (ii) a second optical receiving unit 33B for receiving reflected light that corresponds to sub beam a; and (iii) a third optical receiving unit 33C for receiving reflected light that corresponds to sub beam b; and where this first optical receiving unit 33A is divided into four, and the second and third optical receiving units 33B and 33C are divided into two. Of the divisions a, b, c and d of the first optical receiving unit 33A, divisions a and c are connected to the input stage of an adder 40A-1, and divisions b and d are connected to the input stage of an adder 40A-2, and the output stages of both of these adders 40A-1 and 40A-2 are connected to the input stage of a subtractor 41A. As a result, a signal as given by Equation 1 below is output from the subtractor 41A as the push-pull signal PPmain that corresponds to the main beam, and supplied to a DPP signal generation unit (where a, b, c and d in Equation 1 are the voltage levels of the received optical signals of the corresponding divisions).

$$PPmain=(a+c)-(b+d) \quad \text{(Equation 1)}$$

On the other hand, in the case of the second optical receiving unit 33B and third optical receiving unit 33C that correspond to sub beams a and b; (i) the divisions e and f of the second optical receiving unit 33B are connected to the input stage of a subtractor 41B; and (ii) the divisions g and h of the third optical receiving unit 33C are connected to the input stage of a subtractor 41C, and each supply a received optical signal to the corresponding subtractor 41B, 41C. As a result, these subtractors 41B and 41C generate push-pull signals PPsuba and PPsubb that correspond to the sub beams a and b, and supply these push-pull signals PPsuba and PPsubb to a subtractor 42 and DPP signal generation unit 43.

Next, the subtractor 42 is an element for generating a difference signal DPsub (or in other words, DPsub=PPsuba−PPsubb) that corresponds to the difference value between both push-pull signals PPsuba and PPsubb, and supplies the generated difference signal DPsub to the diffraction grating angle control unit GC.

The DPP signal generation unit 43 comprises: an adder 431, amplification circuit 432 and subtractor 433, and uses the push-pull signals PPmain, PPsuba and PPsubb to generate a differential push-pull signal DPP according to Equation 2 below, and supplies the generated differential push-pull signal DPP to the diffraction grating angle control unit GC.

$$DPP=PPmain-G(PPsuba+PPsubb) \quad \text{Equation 2}$$

(G is a coefficient that corresponds to the amount of diffracted light of the main beam and sub beams.)

The differential push-pull signal DPP that is generated by the DPP signal generation unit 43 is also supplied to the actuator drive unit AD, and as a result, the optical pickup device PU is capable of DPP type tracking correction.

The method used by the focus error signal generation unit 44 to generate a focus error signal is arbitrary, for example, in the case where an astigmatic method is used, a cylindrical lens can be used as an error detection lens 32 so that a focus error signal is generated based on the received optical signal that is output from the first optical receiving unit 33A.

Next, the diffraction grating angle control unit GC comprises a rough adjustment unit 51 and a fine adjustment unit 52, and performs the rough adjustment, initial fine adjustment and continuous fine adjustment described above based on the theory described below.

(a) Angle Adjustment By the Rough Adjustment Unit

The rough adjustment unit 51 executes control for performing the rough adjustment described above, however, the angle β of the diffraction grating 121 that is set during this rough adjustment is quantitatively calculated according to how much the position of the second object lens 262 shifts in the radial direction from the center position of the optical disc DK. This method of calculation will be described in detail with reference to FIG. 4. FIG. 4 is a drawing showing the theory of the rough adjustment of this embodiment, where in FIG. 4, the slider shaft is represented by the X axis.

In the case shown in FIG. 4, the second object lens 262 moves along the object lens movement axis (indicated by the 2-dot dash line in FIG. 4) that is parallel to the slider shaft and is separated from it by a distance 'L'. Here, when the second object lens 262 is at a position that is shifted a distance 'r' in the slider shaft direction from the center of the optical disc DK, the point where the main beam is shone is taken to be P, and the angle that is formed by the slider shaft, the center point 'o' of the optical disk DK and the point P is taken to be angle θ, and is given by Equation 3 below, $$\theta=\tan^{-1}(L/r) \quad \text{Equation 3}$$

and the angle that is formed by the track tangent line (the 1-dot dash line in FIG. 4) and the object lens movement axis is taken to be angle Φ, and is given by Equation 4 below.

$$\Phi = (\pi/2) - \tan^{-1}(L/r) \quad \text{Equation 4}$$

Here, when the shifting of the main beam and sub beams in the track tangential direction by a distance of 'Δv0' is taken to be a conditional value for making tracking correction possible, it can be seen that the angle β(r) that is formed between the line that connects the point where the main beam is shone and the points where the sub beams are shone and the slider shaft is given by Equation (5) below.

$$\beta(r) = (\pi/2) - \tan^{-1}(L/r) + \sin^{-1}(\Delta v0/D) \quad \text{Equation (5)}$$

In Equation (5), the term 'D' is a constant that indicates the distance on the surface of the optical disc DK between the main beam and the sub beams, and it is a value that is set according to the diffraction characteristics of the diffraction grating 121. Also, in Equation (5) the distances 'L' and 'Δv0' are constants that are set when designing the optical system, so it can be seen that the angle β of the diffraction grating 211 depends on only the amount of shifting 'r' in the radial direction of the second object lens 262. In this embodiment, rough adjustment is performed by taking into consideration these characteristics, and taking the amount of shifting in the radial direction of the optical disc of the carriage to be 'r' and substituting it into Equation (5).

The method used for detecting the amount of shifting of the carriage is arbitrary, for example, (method a) it is possible to calculate how many tracks that the carriage has moved from the innermost track of the optical disc DK by counting the number of times there is a zero crossing of the received optical signal that is output from the first optical receiving unit 33A, and then calculating the amount of shifting 'r' based on that number of tracks; or (method b) it is possible to use a saved table for converting the recording address that is read from the optical disk to a shifting amount, and calculating the amount of shifting 'r' based on that table and the recording address that is read from the optical disc DK.

(b) Angle Adjustment By the Fine Adjustment Unit 52

Next, the theory of angle adjustments (more specifically, initial fine adjustment and continuous fine adjustment) of the diffraction grating 211 that is performed by the fine adjustment unit 52 will be explained individually.

<Initial Fine Adjustment>

First, in regards to the initial fine adjustment, in this embodiment, angle adjustment of the diffraction grating 211 is performed based on both the differential push-pull signal DPP and the difference signal DPsub that is supplied from the error signal generation unit EG. The reason for performing adjustment of the angle β of the diffraction grating 211 based on these two signals DPP and DPsub in this way will be explained with reference to FIGS. 5A and 5B. FIG. 5A is a graph showing the waveform of the differential push-pull signal DPP that is obtained when the diffraction grating 211 is rotated when the track servo loop is open, and FIG. 5B is a graph showing the waveform of the difference signal DPsub under the same conditions, where the value of the angle β shown in FIG. 4 is expressed along the horizontal axis, and the value of the signal level is expressed along the vertical axis.

First, the push-pull signals PPsuba and PPsubb that are generated in the error signal generation unit EG, are given by Equation (6) and Equation (7) below, in which 'GP' is the pitch of the groove track of the optical disc DK, and 'v' is the shift from the center of the main beam in the radial direction of the disc from the center line of the groove track.

$$PPsuba = A\{\sin 2\pi(v+\Delta v0)/GP + \text{offset}\} \quad \text{Equation (6)}$$

$$PPsubb = A\{\sin 2\pi(v-\Delta v0)/GP + \text{offset}\} \quad \text{Equation (7)}$$

In these equations, the term 'offset' is the push-pull offset that is generated when the object lens moves during tracking correction, and 'Δv0' is the ideal value of the distance in the direction normal to the track between the main beam and sub beams (see FIG. 4).

Here, in the ideal state for performing tracking correction by the DPP method (in other words, the state in which the sub beams a and b are shone onto to the land tracks that are adjacent to the groove track on which the main beam is shone), the push-pull signals PPsuba and PPsubb have the same phase, so the value of the difference signal DPsub becomes '0' (point A in FIG. 5B). Therefore, as a rule, it is considered sufficient to adjust the angle β of the diffraction grating 211 so that the value of the difference signal DPsub becomes '0'.

However, when considering the condition when only the rough adjustment is completed, there is a possibility that the all of the beams, the main beam and sub beams a, b, will be shone onto the groove track due to inadequate adjustment during rough adjustment. Even when this kind of situation occurs, the push-pull signals PPsuba and PPsubb will have the same phase, and the difference signal DPsub will become '0' (point B in FIG. 5B). Therefore, when the angle β of the diffraction grating 211 is adjusted so that the difference signal DPsub becomes '0' at the instant when rough adjustment is completed, there is a danger that the diffraction grating 211 will be adjust to a wrong angle β.

On the other hand, when considering the push-pull signal PPmain that corresponds to the main beam, this push-pull signal PPmain is given by Equation (8) below, and the differential signal DPP is given by Equation (9).

$$PPmain = \sin(2\pi v/GP) + \text{offset} \quad \text{Equation (8)}$$

$$\begin{aligned}DPP &= PPmain - G(PPsuba + PPsubb) \\&= \sin(2\pi v/GP) + \text{offset} - (1/2A) \\&\quad [A\{\sin 2\pi(v+\Delta v0)/GP + \text{offset}\} + \\&\quad A\{\sin 2\pi(v-\Delta v0)/GP + \text{offset}\} \\&= \{1 - \cos(2\pi\Delta v0/GP)\}\sin(2\pi v/GP)\end{aligned} \quad \text{Equation (9)}$$

In the ideal state for performing tracking control in the DPP method, the phase of the push-pull signal PPmain is opposite that of the push-pull signals PPsuba and PPsubb that correspond to sub beams a and b, and the amplitude level of the differential push-pull signal DPP becomes a maximum (point C in FIG. 5A). However, when all of the beams, the main beam and sub beams a and b, are shone on the groove track, the phase of the push-pull signal PPmain is the same as that of the push-pull signals PPsuba and PPsubb, and the differential push-pull signal DPP becomes '0' (point D in FIG. 5A).

From the relationships described above, in order for the main beam and sub beams a and b to be put into the ideal state, by rotating the diffraction grating 211 to an angle β at which the amplitude value of the differential signal DPP is a maximum and the difference signal DPsub becomes '0', the main beam and sub beams a and b are all shone in the ideal state.

Therefore, in this initial fine adjustment, in order that these conditions are satisfied, the fine adjustment unit controls the angle β of the diffraction grating 211. More specifically, the fine adjustment unit 52 rotates the diffraction grating 211 a specified amount in a set direction, and when doing this determines whether or not the differential push-pull signal DPP becomes large and the difference signal DPsub becomes small. When the judgment result is 'NO', the fine adjustment unit 52 then rotates the diffraction grating 211 a specified amount in the opposite direction, and when the judgment result is 'YES', the fine adjustment unit 52 performs control that rotates the diffraction grating 211 a specified amount in that set direction (so-called hill-climbing control). Ideally, it is preferred that the angle β be adjusted until the amplitude value of the differential push-pull signal DPP becomes large and the difference signal DPsub becomes '0', however, in actual control, it is difficult to perform control up to the ideal state, so a target amplitude value is set in advance, and initial fine adjustment ends as soon as that target value is reached.

<Continuous Fine Adjustment>

Figures 6A, 6B:
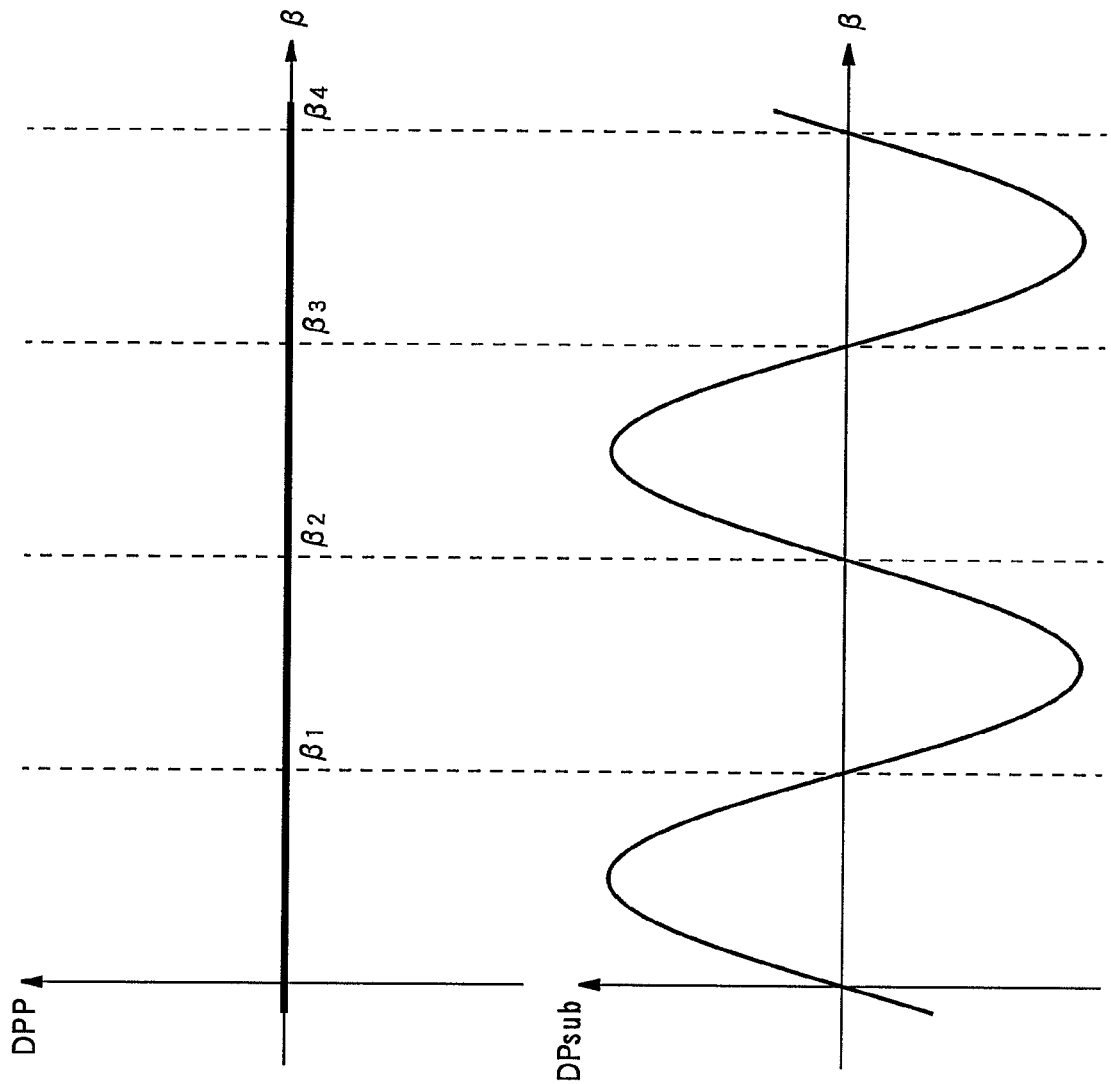
FIG. 6A is a graph showing the waveform of the differential push-pull signal DPP that is obtained when the diffraction grating 211 is rotated when the tracking servo loop is in the closed state.
FIG. 6B is a graph showing the waveform of the difference signal DPsub under the same conditions.

Next, the continuous fine adjustment will be explained with reference to FIGS. 6A and 6B. FIG. 6A is a graph that shows the waveform of the differential push-pull signal DPP that is obtained when the diffraction grating 211 is rotated when the tracking servo loop is closed; and FIG. 6B is a graph that shows the waveform of the difference signal DPsub under the same conditions, where the vertical axis and horizontal axis are the same as in FIGS. 5A, 5B described above.

As shown in FIGS. 6A, 6B, when the tracking servo loop becomes closed, the state is set for tracking correction to be executed, so (i) the differential push-pull signal DPP is maintained at a value near '0'; and (ii) the difference signal DPsub has a sinusoidal waveform.

When this state is set, it becomes impossible to identify the ideal state based on the differential signal DPP, however, since the angle β of the diffraction grating 211 has already been brought close to the ideal state through the initial fine adjustment described above, by changing the angle β of the diffraction grating 211 so that the difference signal DPsub='0', it becomes possible to put the state of where the main beam and sub beams a, b are shone in the ideal state. Therefore, in this embodiment, a method is adopted in which a rotation mechanism 212 rotates the diffraction grating 211 in a direction that satisfies the required relationship.

[1.2] Operation of the First Embodiment

Figure 7:
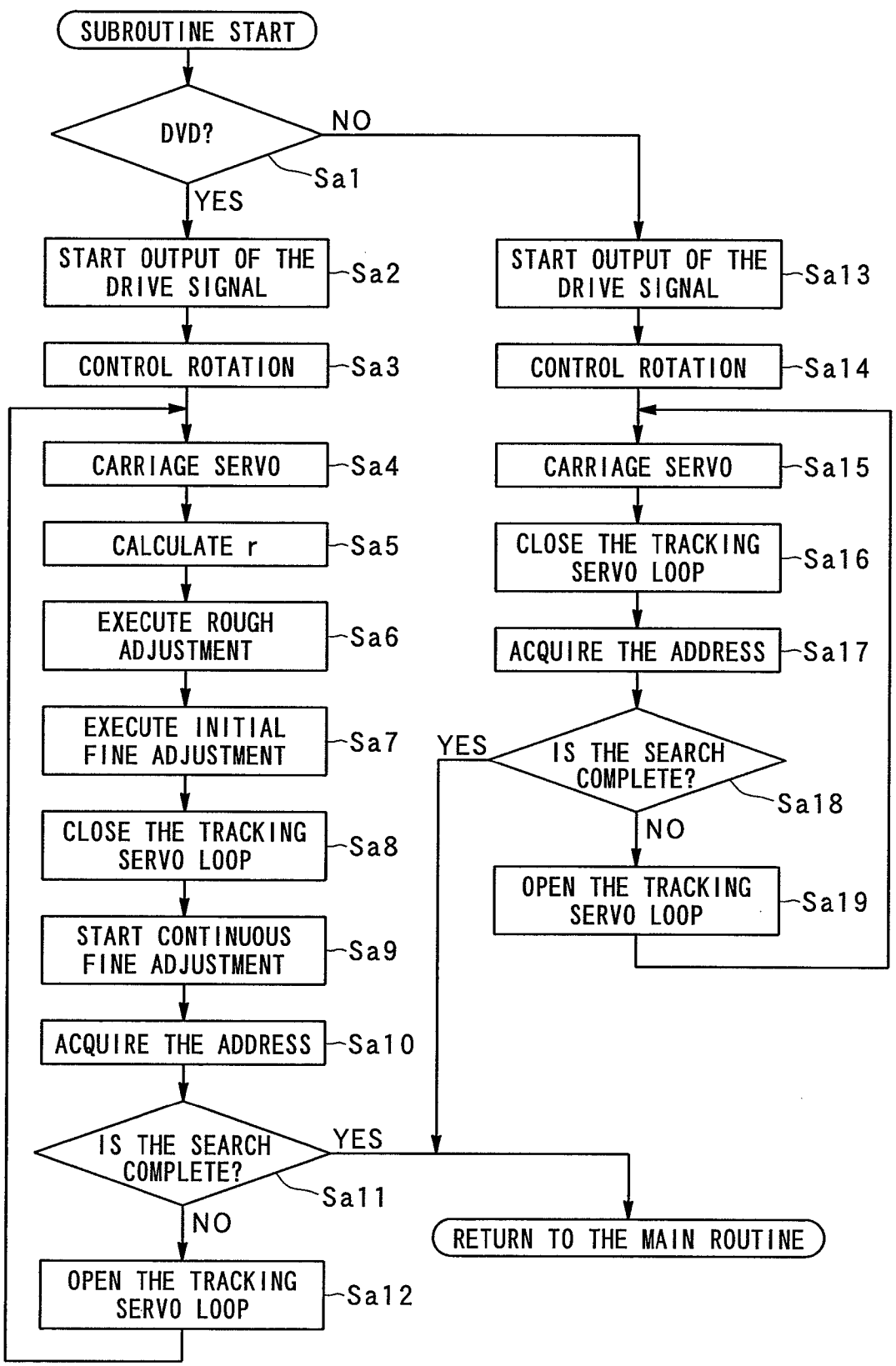
FIG. 7 is a drawing showing the processing that is executed in the first embodiment of the invention when the control unit C performs a track search.

Next, the operation of the information recording/reproduction device RP of this embodiment will be explained in detail with reference to FIG. 7. FIG. 7 is a drawing showing the process that is executed by the control unit C of this embodiment during a track search, where the process is executed by the control unit C as a sub routine to the main routine that is executed when recording data onto or reproducing data from an optical disc DK.

First, when a situation occurs in which a track search is to be performed, such as in the case when a user inserts an optical disc DK into the information recording/reproduction device RP, or when a specified input operation is performed (for example input operation for recording data), the control unit C is set to the state of determining whether or not the optical disc DK that is the object of recording or reproduction is a DVD (step Sa1). Also, when the result of this determination is 'NO' (in other words, when the optical disc DK is a BD), the control unit C outputs a drive signal to the drive circuit D for performing a track search (step Sa13), and is then set to the state for controlling the rotation of a spindle motor (not shown in the figures) (Step Sa14).

After this state is set, the optical disc DK rotates as the spindle motor rotates, and the state is set in which a 405 nm light beam is emitted from the light source unit 1. The light beam that is emitted from the light source unit 1 in this way is diffracted by the diffraction grating 211, after which it passes in order through the PBS 22, collimator lens 23 and λ/4 plate, and after it has been changed to circular polarized light, it is reflected upward in the drawing by the dichroic mirror 251, and shone onto the optical disc DK by the first object lens 261. Also, the light that is reflected from the surface of the optical disc DK passes through the λ/4 plate by way of the same optical path as the forward path, and after the direction of polarization has been changed by π/2 from the forward path and is changed to a state of linearly polarized light, the light is reflected downward in the drawing by the PBS 22, and received by the first thru third optical receiving units 33A to 33C of the OEIC 33, and the state is set in which a differential push-pull signal DPP, difference signal DPsub and focus error signal are output from the error signal generation unit EG.

Next, the control unit C moves the carriage to a position that corresponds to the track to be searched (step Sa15), and then outputs a control signal to the actuator drive unit AD, and after the tracking servo loop has been closed (step Sa16), acquires the address of the track being searched (step Sa17), after which the state is set for determining based on that address whether or not the light beams are shone onto the track that is the object of the search (step Sa18). Also, in this judgment, when the result is determined to be "YES", the control unit C ends the process shown in FIG. 7 and returns processing to the main routine, however, when the result of this judgment is determined to be 'NO', the control unit C outputs a control signal to the actuator drive unit AD, and after the tracking servo loop has been opened (step Sa19), returns processing to step Sa15, and repeats the processing from step Sa15 to step Sa19 until the track that is the object of the search has been reached.

On the other hand, in step Sa1, when the result of judgment is determined to be 'YES', the control unit C outputs a drive signal to the drive circuit D to perform a track search (step Sa2) and performs control to rotate the spindle motor (step Sa3). A 660 nm light beam that is emitted from the light source unit 1 based on the drive signal that is supplied from the control unit C in this way is diffracted by the diffraction grating 211, after which it passes in order through the PBS 22, collimator lens 23 and λ/4 plate, and after the light has been changed to a circular polarized light state, the light passes through the dichroic mirror 251 and is reflected upward in the drawing by the mirror 252 and then shone onto the optical disc DK from the second object lens 262. Also, the light that is reflected from the surface of the optical disc DK passes through the λ/4 plate by way of the same optical path as the forward path, and after the direction of polarization has been changed by π/2 from the forward path and is changed to a state of linearly polarized light, the light is reflected downward in the drawing by the PBS 22, and received by the first thru third optical receiving units 33A to 33C of the OEIC 33, and the state is set in which a differential push-pull signal DPP, difference signal DPsub and focus error signal are output from the error signal generation unit EG.

After this state is set, the control unit moves the carriage to a position that corresponds to the track that is the object of the search (step Sa4), then calculates the distance 'r' based on the distance that the carriage was moved (step Sa5), and supplies a control signal that includes the calculated value of the distance 'r' to the rough adjustment unit 51 of the diffraction grating angle control unit GC to execute rough adjustment (step Sa6).

On the other hand, when this control signal is supplied, the rough adjustment unit 51 substitutes the distance 'r' that is included in the control signal into Equation (5) and calculates the angle β, and based on the calculation result, outputs a control signal to the rotation mechanism 212 of the diffraction unit 21. As a result, the rotation mechanism 212 rotates the diffraction grating 211, and rough adjustment is performed.

After rough adjustment of the diffraction grating 211 is completed in this way, the control unit C then outputs a control signal to the fine adjustment unit 52 to execute the initial fine adjustment (step Sa7). After the control signal is supplied, the fine adjustment unit 52 executes the hill-climbing control described above based on the amplitude values of the differential push-pull signal DPP and difference signal DPsub that are supplied from the error signal generation unit EG. Also, the fine adjustment unit 52 ends initial fine adjustment at the instant when the amplitude values of the differential push-pull signal DPP and difference signal DPsub reach preset target values.

Next, after this initial fine adjustment is complete, the control unit C supplies a control signal to the actuator drive unit AD to change the tracking servo loop to the closed state (step Sa8). As a result, the actuator drive circuit AD starts tracking correction based on the differential push-pull signal DPP.

After this state is set, the control unit C supplies a control signal again to the fine adjustment unit 52 to start the continuous fine adjustment (step Sa9). However, after this control signal is supplied, the fine adjustment unit 52 starts normal feedback control based on just the difference signal DPsub that is supplied from the error signal generation unit EG rather than the hill-climbing control described above, and after that, changes the angle β by rotating the diffraction grating 211 as the difference signal DPsub changes, and moves to the state of adjusting the position where the main beam and sub beams a, b are shone.

Next, in this state, the control unit C acquires the address of the track being searched (step Sa10), and the state is set of determining whether or not the light beams are being shone on the track that is the object of the search based on that address (step Sa11). When the result of this judgment is determined to be 'YES', the control unit ends the processing shown in FIG. 7 and returns processing to the main routine. As a result, while the optical disc DK is inserted, the diffraction grating 211 is maintained at that set angle, and when recording data, continuous fine adjustment is continuously executed until the recording of data on the optical disc DK is finished.

On the other hand, when the result of the judgment is determined to be 'NO', the control unit C outputs a control signal to the actuator drive unit AD, and after the tracking server loop is opened (step Sa12), returns processing to step Sa4, and repeats the processing from step Sa4 to step Sa12 until reaching the track that is the object of the search. As a result, the angle β of the diffraction grating 211 is adjusted and the positions where the main beam and sub beams a, b are shone are changed in order to maintain the optimum state for shining the light beams.

In this way, the information recording/reproduction device RP of this embodiment is constructed so that when a second object lens 262 is placed at a position that is shifted a specified amount in the tangential direction from the radial axis that passes through the center point of the recording track of the optical disc DK, it is possible for a servo unit S to control the diffraction unit 21 according to the track tangential angle at the position where the main beam and sub beams a, b are shone onto the optical disc DK, and to change the distance in the radial direction between the main beam and sub beams a, b on the optical disc DK.

Therefore, the optical pickup device PU moves along the slider shaft, and even under conditions in which the track tangential angle changes, the positions where the sub beams are shone are accurately and suitably adjusted, making it possible to perform tracking correction by the DPP method using three beams.

Also, in the information recording/reproduction device RP of this embodiment, construction is such that rough adjustment is performed based on Equation (5) above, so it is possible to perform angle adjustment somewhat before initial adjustment, and thus it is possible to shorten the amount of time required for performing angle adjustment.

Moreover, in the information recording/reproduction device RP of this embodiment, construction is such that the distance in the radial direction between the main beam and sub beams a, b on the optical disc DK is changed to a distance where the difference signal DPsub becomes '0', so regardless of the state of the tracking servo loop (in other words, opened or closed state), it is possible to adjust the positions where the main beam and sub beams a, b are shone.

Furthermore, in the information recording/reproduction device RP of this embodiment, angle adjustment of the diffraction grating 211 is performed using both the differential push-pull signal DPP and difference signal DPsub, so it is possible to accurately and suitably adjust the positions where the main beam and sub beams a, b are shone even when after rough adjustment ends the sub beams a, b appear to be shining on the groove track.

In the first embodiment described above, construction was employed in which the angle β of the diffraction grating 211 is adjusted in three stages, however, it is not necessary to execute all of these, for example, it is possible to execute just initial fine adjustment and continuous fine adjustment without performing rough adjustment.

Also, it is possible to perform just rough adjustment, and in that case, the distance 'r' changes linearly as the recording of data proceeds, so construction is possible in which the angle β of the diffraction grating 211 is adjusted based on Equation (5) above at a set timing (for example, timing after a certain number of tracks).

Moreover, in the first embodiment described above, a method was employed in which the positions where the main beam and sub beams a, b are shone are adjusted by physically rotating the diffraction grating 211 inside the optical pickup device PU, however, it is also possible to employ a method in which the diffraction grating is constructed from a liquid crystal panel, and the phase cycle of the diffraction grating is changed based on a control signal that is supplied from the diffraction grating angle control unit GC. In that case, it is possible to save a table in the rough adjustment unit 51 for determining which phase cycle to set according to the value of the shifted distance 'r' from the center of the optical disc DK, and to perform adjustment of the phase cycle based on that table.

Furthermore, in the first embodiment described above, construction was employed in which the optical pickup device PU comprises two object lenses 261 and 262, however, the number of object lenses in the optical pickup device PU is arbitrary, for example, even in the case of only one object lens, when the position of that object lens is located at a position that is shifted in the tangential direction from the slider shaft, it is possible to adjust the angle of the diffraction grating 211 by using the same construction as described above.

Also, in the first embodiment described above, a path dividing/combining unit 25 was constructed using a dichroic mirror 251 and mirror 252, however, construction is not limited to this and any construction can be used as long as the light beam that is emitted from the light source unit 1 can be divided into two paths or combined. For example, a half mirror could be used in the place of the dichroic mirror 251.

Moreover, in the first embodiment described above, the case was explained in which the recording of data onto or reproduction of data from two kinds of optical discs DK, BD and DVD, was explained. However, the types of optical discs DK and the number of recording formats for which recording or reproduction is performed by the information recording/reproduction device RP is arbitrary, for example, it is possible to rotate the diffraction grating 211 and change the positions where the main beam and sub beams a and b are shone using the same method even for an optical pickup device PU that corresponds to the four recording formats CD, DVD, BD and HD-DVD.

Also, in the first embodiment described above, construction is employed in which a semiconductor laser that emits a 405 nm light beam, and a semiconductor laser that emits a 660 nm light beam are packaged into one light source unit 1, however, it is also possible to place each semiconductor laser separately inside the optical pickup device PU. In that case, a dichroic mirror, for example, can be placed between the diffraction unit 21 and semiconductor lasers to guide the light beams that are emitted form the semiconductor laser to the diffraction unit 21.

Furthermore, in the first embodiment described above, an example was explained in which the control unit C and drive circuit D were a separate device (for example, a CPU) from the optical pickup device PU, however, they could also be integrated with the optical pickup device.

[1.3] Variation of the First Embodiment

In the first embodiment described above, the case was explained in which tracking correction was performed by the DPP method, however, the same method as used in the first embodiment can be used to perform CTC. However, when performing CTC, it is necessary to shine the main beam and sub beams a, b on the groove track. Therefore, as was shown in FIG. 5, in the initial fine adjustment, it is necessary to keep in mind that the angle β of the diffraction grating 211 must be adjusted so that both the differential push-pull signal DPP and difference signal DPsub become '0'. The methods for performing the rough adjustment and continuous fine adjustment are the same as in the first embodiment, so a detailed explanation of them is omitted here. In this way, with this variation, it is possible to adjust the angle of the diffraction grating 211, and accurately and suitably adjust the positions where the sub beams are shone not only when performing tracking correction, but even in the case of performing CTC.

[2] Second Embodiment

In the information recording/reproduction device RP of the first embodiment described above, construction is employed in which initial fine adjustment is performed by performing hill-climbing control that uses the differential puss-pull signal DPP and difference signal DPsub. However, in the information recording/reproduction device RP of this embodiment, the angle β of the diffraction grating 211 is suitably adjusted by performing initial fine adjustment without performing hill-climbing control. The operation when performing the rough adjustment and continuous fine adjustment is the same as is the first embodiment described above.

The theory of the initial fine adjustment that is performed by the information recording/reproduction device RP of this embodiment is explained with reference to FIGS. 8A and 8B. FIG. 8A is a graph showing the waveform of the push-pull signal PPmain that is obtained when the diffraction grating 211 is rotated when the tracking servo loop is in the open state, and FIG. 8B is a graph showing the waveform of the difference signal DPsub under the same conditions.

First, as shown in FIG. 8B, the difference signal DPsub includes a high-frequency signal component, so it cannot be used as is for adjusting the angle β of the diffraction grating 211. However, when the main beam is shone in the ideal state (hereafter, this is referred to as the ON track state) the difference signal DPsub takes on the value that is shown by the solid line in FIG. 8B, so by holding samples of the amplitude values of the difference signal DPsub in the ON track state and then connecting each of the sample values, a revised difference signal RDPsub that is shown by the solid line in FIG. 8B is obtained.

By adjusting the angle β of the diffraction grating 211 with respect to the point where the value of the revised difference signal RDPsub becomes '0', it becomes possible to perform initial fine adjustment when the tracking servo loop is in the open state without performing hill-climbing control.

On the other hand, when attempting to acquire this revised difference signal RDPsub, there is a problem in identifying the ON track state and identifying the sampling timing for the difference signal DPsub. In this embodiment, the method for identifying the ON track state uses the push-pull signal PPmain (FIG. 8A) that corresponds to the main beam.

In other words, in the ON track state, the amplitude value of the push-pull signal PPmain becomes '0', so the timing that the ON track state is set is identified using the push-pull signal PPmain, and samples of the values of the difference signal DPsub can be held at that timing. In regards to the method of using the push-pull signal PPmain as the signal for detecting the ON track state, it is only an example, and it is also possible to use the differential push-pull signal.

Figure 9:
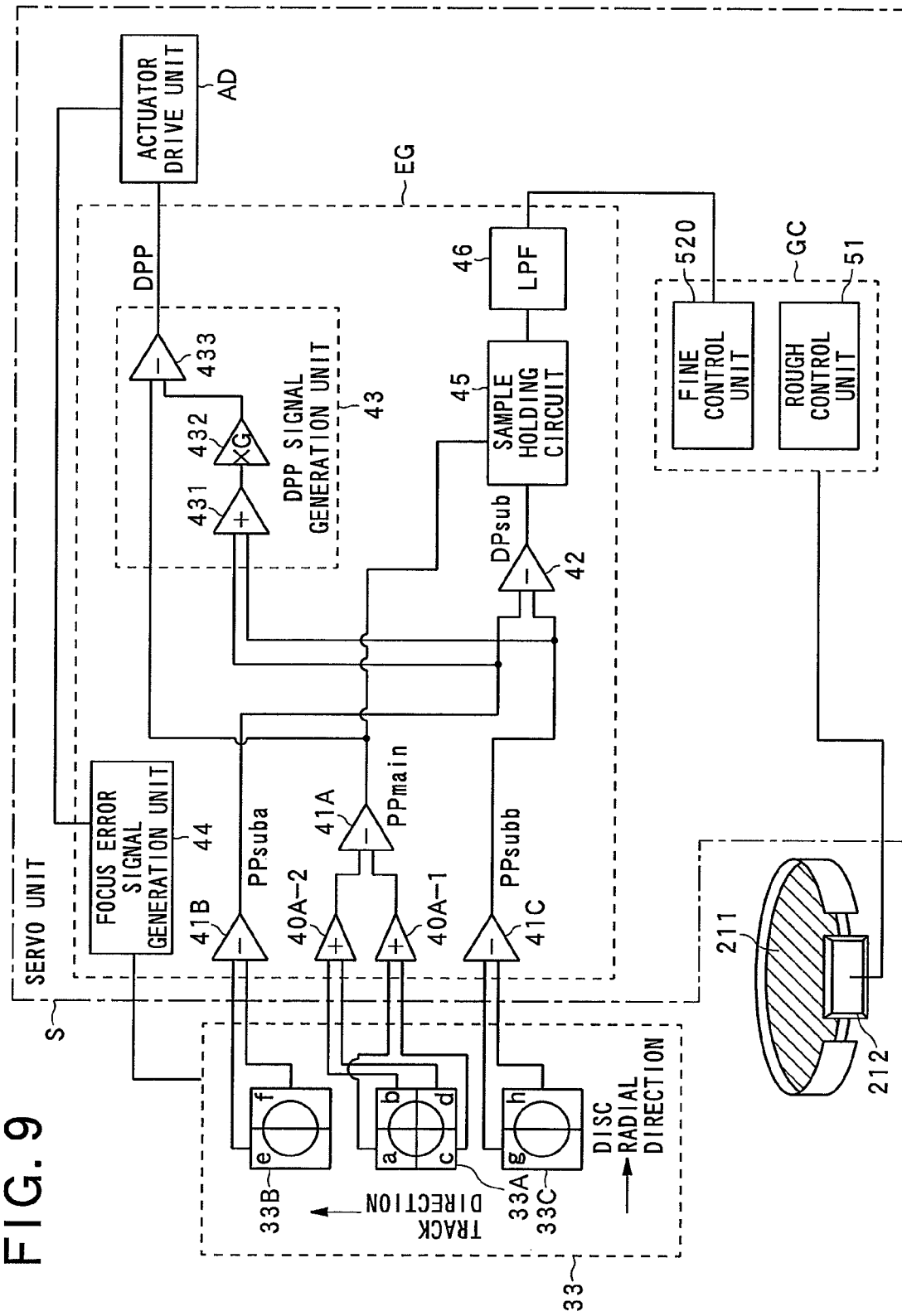
FIG. 9 is a block diagram showing the control of a servo unit in the second embodiment of the invention.

The detailed construction of the servo unit S of the information recording/reproduction device RP of this embodiment that makes this theory possible is explained with reference to FIG. 9. FIG. 9 is a drawing showing the construction of the servo unit S of this embodiment, and in FIG. 9 the same reference numbers are used for elements that are the same as those shown in FIG. 3 and described above.

As shown in FIG. 9, in this embodiment, construction is such that the differential push-pull signal DPP that is generated by the DPP signal generation unit 43 is provided only to the actuator drive unit AD. Also, the error signal generation unit EG of this embodiment comprises a sample hold circuit 45 for holding samples of the amplitude values of the difference signal DPsub, and this sample hold circuit 45 holds samples of the difference signal DPsub at the ON track timing of the main beam based on the push-pull signal PPmain that is provided from the subtractor 41A.

Also, this sample hold circuit 45 is connected to a LPF (Low Pass Filter) 46, and at specified timing, outputs the sample values that it holds to the LPF 46. As a result, the high-frequency component is removed by the LPF 46, and the signal that is shown by the solid line in FIG. 8B is provided to the fine adjustment unit 520. Also, the fine adjustment unit 520 performs initial fine adjustment based on the signal that is supplied from the LPF 46.

In this way, with the information recording/reproduction device RP of this embodiment, it is possible to perform initial fine adjustment without performing hill-climbing control.

The invention claimed is:

1. An optical pickup that focuses a light beam onto an optical recording medium having a spiral shaped recording track, and receives the light from that light beam that is reflected by the optical recording medium, comprising:
a diffraction device for diffracting a light beam that is emitted from a light source and emitting a main beam and first and second sub beams;
a focusing device for focusing the main beam and first and second sub beams onto the optical recording medium at positions that are shifted a specified amount in the tangential direction from the radial axis that passes through the center point of the recording track;
a light receiving device for receiving the light from the main beam and first and second sub beams that is reflected from the optical recording medium, and outputting an optical signal that corresponds to each beam;
an inter-beam distance adjustment device for controlling the diffraction device according to the tangent angle of the recording track near the positions where the main beam and first and second sub beams are focused, and changing the distance in the radial direction between the main beam and first and second sub beams on the optical recording medium;
a push-pull signal generation device for generating push-pull signals that corresponding to the main beam and first and second sub beams based on the received optical signals that correspond to the main beam and first and second sub beams; wherein
the inter-beam distance adjustment device changes the distance in the radial direction between the main beam and first and second beams on the optical recording medium to a distance so that the value of the difference between the push-pull signal that corresponds to the first sub beam and the push-pull signal that corresponds to the second sub beam becomes almost zero.

2. The optical pickup device of claim 1 further comprises:
a differential push-pull signal generation device for generating a differential push-pull signal based on the received optical signals that correspond to the main beam and first and second sub beams; wherein
the inter-beam distance adjustment device
changes the distance in the radial direction between the main beam and first and second sub beams on the optical recording medium to a distance where (a) the amplitude of the differential push-pull signal becomes the almost maximum, or (b) the amplitude of the differential push-pull signal becomes almost zero, and where the value of the difference between the push-pull signal that corresponds to the first sub beam and the push-pull signal that corresponds to the second sub beam becomes almost zero.

3. The optical pickup device of claim 1 further comprises:
a push-pull signal generation device for generating push-pull signals that correspond to the main beam and first and second sub beams based on the received optical signals that correspond to the main beam and first and second sub beams; and
a difference signal generation device for generating a difference signal of the difference between the push-pull signal that corresponds to the first sub beam and the push-pull signal that corresponds to the second sub beam; wherein the inter-beam distance adjustment device samples the difference signal at the timing when the main beam is focused onto the recording track, and changes the distance in the radial direction between the main beam and first and second sub beams on the optical recording medium based on the sampled difference signal.

4. The optical pickup device of claim 1 wherein
the diffraction device is constructed of liquid crystal; and
the inter-beam distance adjustment device changes the distance in the radial direction between the main beam and first and second sub beams on the optical recording medium by changing the grating period of the diffraction device.

5. An optical pickup device that focuses a light beam on an optical recording medium having a spiral shaped recording track, comprising:
a diffraction device for diffracting a light beam that is emitted from a light source and emitting a main beam and first and second sub beams;
a focusing device for focusing the main beam and first and second sub beams onto the recording track;
a light receiving device for receiving the light from the main beam and first and second sub beams that is reflected from the optical recording medium, and outputting optical signals that corresponds to each beam;
a push-pull signal generation device for generating push-pull signals that correspond to the main beam and first and second sub beams based on the received optical signals that correspond to the main beam and first and second sub beams; and
an inter-beam distance adjustment device for changing the distance in the radial direction between the main beam and first and second sub beams on the optical recording medium to a distance where the value of the difference between the push-pull signal that corresponds to the first sub beam and the push-pull signal that corresponds to the second sub beam becomes almost zero.

6. An information recording/reproduction device comprising:
the optical pickup device of any one of the claims 1 and 2 to 5;
a drive device for driving the optical pickup device;
a control device for controlling the recording of information onto or reproduction of information from the optical recording medium by controlling the drive device; and
a output device for outputting a signal that corresponds to the received light result by the optical pickup device.

7. A control method for controlling an optical pickup that focuses a light beam onto an optical recording medium having a spiral shaped recording track, and receives the light from that light beam that is reflected by the optical recording medium, and that comprises:
a diffraction process of diffracting a light beam that is emitted from a light source and emitting a main beam and first and second sub beams;
a focusing process of focusing the main beam and first and second sub beams onto the optical recording medium at positions that are shifted a specified amount in the tangential direction from the radial axis that passes through the center point of the recording track; and
a light receiving process of receiving the light from the main beam and first and second sub beams that is reflected from the optical recording medium, and outputting an optical signal that corresponds to each beam;
an inter-beam distance adjustment process of controlling the diffraction device according to the tangent angle of the recording track at the positions where the main beam and first and second sub beams are focused, and changing the distance in the radial direction between the main beam and first and second sub beams on the optical recording medium; and a push-pull signal generation process of generating push-pull signals that corresponding to the main beam and first and second sub beams based on the received optical signals that correspond to the main beam and first and second sub beams; wherein the inter-beam distance adjustment process changes the distance in the radial direction between the main beam and first and second beams on the optical recording medium to a distance so that the value of the difference between the push-pull signal that corresponds to the first sub beam and the push-pull signal that corresponds to the second sub beam becomes almost zero.

* * * * *